US011991262B2

United States Patent
Lewis et al.

(10) Patent No.: US 11,991,262 B2
(45) Date of Patent: *May 21, 2024

(54) METHODS, SYSTEMS, AND MEDIA FOR RETRIEVING CONTENT ASSOCIATED WITH LINKS

(71) Applicant: Google LLC, Mountain View, CA (US)

(72) Inventors: Justin Lewis, South San Fracisco, CA (US); Scott Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,324

(22) Filed: Jan. 24, 2022

(65) Prior Publication Data

US 2022/0150329 A1 May 12, 2022

Related U.S. Application Data

(63) Continuation of application No. 16/995,143, filed on Aug. 17, 2020, now Pat. No. 11,233,877, which is a
(Continued)

(51) Int. Cl.
*H04L 67/75* (2022.01)
*G06F 16/951* (2019.01)
(Continued)

(52) U.S. Cl.
CPC ............ *H04L 67/75* (2022.05); *G06F 16/951* (2019.01); *G06F 16/954* (2019.01);
(Continued)

(58) Field of Classification Search
CPC ....... H04L 67/75; H04L 67/02; H04L 67/025; G06F 16/957; G06F 16/951; G06F 16/954

See application file for complete search history.

(56) References Cited

U.S. PATENT DOCUMENTS 7,509,374 B2  3/2009  Trinh et al.
8,302,014 B2  10/2012 Lezama Guadarrama et al.
(Continued)

FOREIGN PATENT DOCUMENTS

CN  101075236  11/2007
CN  102446222  5/2012
(Continued)

OTHER PUBLICATIONS

IP_COM_NPL_1, "Removing Non Visible User Interface Elements", ip.com Disclosure IPCOMooo226025D, Mar. 2013.*
(Continued)

*Primary Examiner* — Todd L Barker
(74) *Attorney, Agent, or Firm* — Shumaker & Sieffert, P.A.

(57) ABSTRACT

Methods, systems, and media for retrieving content associated with links are provided. In some embodiments, the method comprises: transmitting, from a user device to a server, a request for content corresponding to a page to be presented on the user device; receiving, from the server, the content corresponding to the page and a mapping of one or more links included in the content corresponding to the page to one or more page types associated with each of the one or more links; storing, on the user device, the received mapping; causing the content of the page to be presented on the user device; receiving a selection of one of the one or more links included in the content corresponding to the page; identifying a page type corresponding to the selected link based on the stored mapping; transmitting, to the server, a request for content associated with the selected link; causing user interface elements of a user interface associated with the identified page type to be presented on the user device while waiting for the requested content from the server; and in response to receiving the requested content from the
(Continued)

server, causing the received content to be presented within the user interface.

18 Claims, 5 Drawing Sheets

Related U.S. Application Data continuation of application No. 15/495,460, filed on Apr. 24, 2017, now Pat. No. 10,749,988.

(51) Int. Cl.
    *G06F 16/954*     (2019.01)
    *G06F 16/957*     (2019.01)
    *H04L 67/02*     (2022.01)
    *H04L 67/025*     (2022.01)

(52) U.S. Cl.
    CPC ............ *G06F 16/957* (2019.01); *H04L 67/02* (2013.01); *H04L 67/025* (2013.01)

(56) References Cited

U.S. PATENT DOCUMENTS

| | | | |
|---|---|---|---|
| 8,578,261 | B1 | 11/2013 | Gupta et al. |
| 8,656,265 | B1 | 2/2014 | Alan et al. |
| 9,064,011 | B2 | 6/2015 | Maharajh et al. |
| 9,116,999 | B2 | 8/2015 | Teeraparpwong et al. |
| 9,275,162 | B2 | 3/2016 | Brown |
| 9,311,168 | B1 | 4/2016 | Lewis et al. |
| 10,025,856 | B2 * | 7/2018 | Ramachandran ..... G06F 16/951 |
| 10,296,562 | B2 | 5/2019 | Goswami |
| 10,749,988 | B2 | 8/2020 | Lewis et al. |
| 11,233,877 | B2 | 1/2022 | Lewis et al. |
| 11,537,607 | B2 * | 12/2022 | Duke ................... G06F 16/245 |
| 2003/0018799 | A1 | 1/2003 | Eyal |
| 2007/0061486 | A1 | 3/2007 | Trinh et al. |
| 2007/0260749 | A1 | 11/2007 | Lahdensivu |
| 2010/0107114 | A1 * | 4/2010 | Zachcial ............ G06F 16/9535 715/780 |
| 2011/0138376 | A1 | 6/2011 | Kim et al. |
| 2012/0166979 | A1 | 6/2012 | Lewontin |
| 2012/0192063 | A1 | 7/2012 | Koren et al. |
| 2012/0331532 | A1 | 12/2012 | Walters et al. |
| 2013/0191723 | A1 * | 7/2013 | Pappas ................. G06F 40/143 715/234 |
| 2014/0359598 | A1 | 12/2014 | Oliver et al. |
| 2014/0372400 | A1 * | 12/2014 | Ramachandran ..... G06F 16/951 707/706 |
| 2014/0372511 | A1 | 12/2014 | Kapadia et al. |
| 2015/0019944 | A1 | 1/2015 | Kalgi |
| 2015/0121413 | A1 | 4/2015 | Ramakrishnan et al. |
| 2015/0161282 | A1 | 6/2015 | Low et al. |
| 2016/0021051 | A1 * | 1/2016 | Peterson ............... G06F 16/957 715/752 |
| 2016/0179956 | A1 | 6/2016 | Sogani et al. |
| 2017/0126843 | A1 | 5/2017 | Pantea et al. |
| 2017/0230320 | A1 * | 8/2017 | Knight .................. H04L 67/146 |
| 2017/0289339 | A1 | 10/2017 | Riva et al. |

FOREIGN PATENT DOCUMENTS

| | | |
|---|---|---|
| CN | 103678479 | 3/2014 |
| CN | 103699674 | 4/2014 |
| CN | 104007990 | 8/2014 |
| CN | 104866534 | 8/2015 |
| CN | 105760405 | 7/2016 |
| CN | 106095999 | 11/2016 |
| CN | 106354879 | 1/2017 |
| JP | H09101871 | 4/1997 |

OTHER PUBLICATIONS

IP_COM_NPL_2, "Dynamic URL Referral", IP.COM000223864D, Dec. 2012.*
IP_COM_NPL_3, Hover Over Content for user interfaces, IPCOM000236793D, May 2014.*
Oh et al., "Automated Transformation of Template-Based Web Applications into Single Page Applications" IEEE 37th Annual Computer Software and Applications Conference, Jul. 22, 2013, IEEE Publishing.*
Daniel, "Live, Personal Data Integration Through UI-Oriented Computing", International Conference on Web Engineering, Jan. 2015.*
Examination Report dated May 6, 2021 in IN Patent Application No. 201947046306.
Examination Report dated May 7, 2021 in EP Patent Application No. 18703107.5.
International Search Report and Written Opinion dated Mar. 20, 2018 in International Patent Application No. PCT/US2018/013309.
Notice of Allowance dated Apr. 13, 2020 in U.S. Appl. No. 15/495,460.
Notice of Allowance dated Sep. 17, 2021 in U.S. Appl. No. 16/995,143.
Office Action dated Jan. 11, 2019 in U.S. Appl. No. 15/495,460.
Office Action dated May 31, 2019 in U.S. Appl. No. 15/495,460.
Office Action dated Oct. 31, 2019 in U.S. Appl. No. 15/495,460.
Office Action dated Dec. 14, 2020 in JP Patent Application No. 2020-507981.
Office Action dated Dec. 28, 2020 in KR Patent Application No. 10-2019-7034252.
Office Action dated Dec. 1, 2022 in CN Patent Application No. 201880026580.8.
International Preliminary Report on Patentability from International Application No. PCT/US2018/013309 dated Oct. 29, 2019, 7 pp.
Notice of Intent to Grant and Text Intended to Grant from counterpart European Application No. 18703107.5 dated Oct. 24, 2022, 9 pp.
Notice of Intent to Grant from counterpart Chinese Application No. 201880026580.8 dated Jun. 30, 2023, 3 pp.
Prosecution History from U.S. Appl. No. 15/495,460 dated Jan. 11, 2019 through Jan. 23, 2020, 120 pp.
Response to Communication pursuant to Article 94(3) EPC dated May 7, 2021, from counterpart European Application No. 18703107.5 filed Sep. 15, 2021, 22 pp.

* cited by examiner

METHODS, SYSTEMS, AND MEDIA FOR RETRIEVING CONTENT ASSOCIATED WITH LINKS

CROSS-REFERENCE TO RELATED APPLICATION

This application is a continuation of U.S. patent application Ser. No. 16/995,143, filed Aug. 17, 2020, which is a continuation of U.S. Patent Application Ser. No. 15/495,460, filed Apr. 24, 2017, each of which is incorporated by reference herein in its entirety.

TECHNICAL FIELD

The disclosed subject matter relates to methods, systems, and media for retrieving content associated with links.

BACKGROUND

People frequently view content through applications executing on user devices. For example, people may view videos on a mobile device (e.g., a mobile phone or tablet computer) through an application associated with a video sharing service or a social networking service. In some instances, the content can include links to other content, such as links to related articles, links to other videos, links to profiles of other users, etc. However, it can be time-consuming for the application to fetch the content of the link and present it within the application.

In addition, these links to other content in an application typically involve a number of communications with the operating system of the mobile device. For example, the operating system, which is outside of the application, can receive an indication that a link has been selected and determine how such a link should be handled. In continuing this example, the operating system can determine that the application, which transmitted the link to the operating system, should handle the link and can, in response to the determination, transmit the link back to the application.

Accordingly, it is desirable to provide methods, systems, and media for retrieving content associated with links.

SUMMARY

Methods, systems, and media for retrieving content associated with links are provided.

In some embodiments of the disclosed subject matter, a method for retrieving content associated with links is provided, the method comprising: transmitting, from a user device to a server, a request for content corresponding to a page to be presented on the user device; receiving, from the server, the content corresponding to the page and a mapping of one or more links included in the content corresponding to the page to one or more page types associated with each of the one or more links; storing, on the user device, the received mapping; causing the content of the page to be presented on the user device; receiving a selection of one of the one or more links included in the content corresponding to the page; identifying a page type corresponding to the selected link based on the stored mapping; transmitting, to the server, a request for content associated with the selected link; causing user interface elements of a user interface associated with the identified page type to be presented on the user device while waiting for the requested content from the server; and, in response to receiving the requested content from the server, causing the received content to be presented within the user interface.

In some embodiments of the disclosed subject matter, a system for retrieving content associated with links is provided, the system comprising a hardware processor that is configured to: transmit, from a user device to a server, a request for content corresponding to a page to be presented on the user device; receive, from the server, the content corresponding to the page and a mapping of one or more links included in the content corresponding to the page to one or more page types associated with each of the one or more links; store, on the user device, the received mapping; cause the content of the page to be presented on the user device; receive a selection of one of the one or more links included in the content corresponding to the page; identify a page type corresponding to the selected link based on the stored mapping; transmit, to the server, a request for content associated with the selected link; cause user interface elements of a user interface associated with the identified page type to be presented on the user device while waiting for the requested content from the server; and, in response to receiving the requested content from the server, cause the received content to be presented within the user interface.

In accordance with some embodiments of the disclosed subject matter, non-transitory computer-readable media containing computer executable instructions that, when executed by a processor, cause the processor to perform a method for retrieving content associated with links is provided. In some embodiments, the method comprises: transmitting, from a user device to a server, a request for content corresponding to a page to be presented on the user device; receiving, from the server, the content corresponding to the page and a mapping of one or more links included in the content corresponding to the page to one or more page types associated with each of the one or more links; storing, on the user device, the received mapping; causing the content of the page to be presented on the user device; receiving a selection of one of the one or more links included in the content corresponding to the page; identifying a page type corresponding to the selected link based on the stored mapping; transmitting, to the server, a request for content associated with the selected link; causing user interface elements of a user interface associated with the identified page type to be presented on the user device while waiting for the requested content from the server; and, in response to receiving the requested content from the server, causing the received content to be presented within the user interface.

In some embodiments of the disclosed subject matter, a system for retrieving content associated with links is provided, the system comprising: means for transmitting, from a user device to a server, a request for content corresponding to a page to be presented on the user device; means for receiving, from the server, the content corresponding to the page and a mapping of one or more links included in the content corresponding to the page to one or more page types associated with each of the one or more links; means for storing, on the user device, the received mapping; means for causing the content of the page to be presented on the user device; means for receiving a selection of one of the one or more links included in the content corresponding to the page; means for identifying a page type corresponding to the selected link based on the stored mapping; means for transmitting, to the server, a request for content associated with the selected link; means for causing user interface elements of a user interface associated with the identified page type to be presented on the user device while waiting for the requested content from the server; and means for causing the received content to be presented within the user interface in response to receiving the requested content from the server.

In some embodiments, the page is presented within an application executing on the user device. In some embodiments, the content associated with the selected link is third-party content provided by an entity not associated with the application. In some embodiments, the content corresponding to the page and the received content corresponding to the selected link are presented within a web browser application executing within the application executing on the user device.

In some embodiments, the system further comprises means for inserting an event handler for each of the one or more links in the content corresponding to the page prior to causing the content of the page to be presented on the user device. In some embodiments, the event handler indicates a function that identifies the page type corresponding to the selected link.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
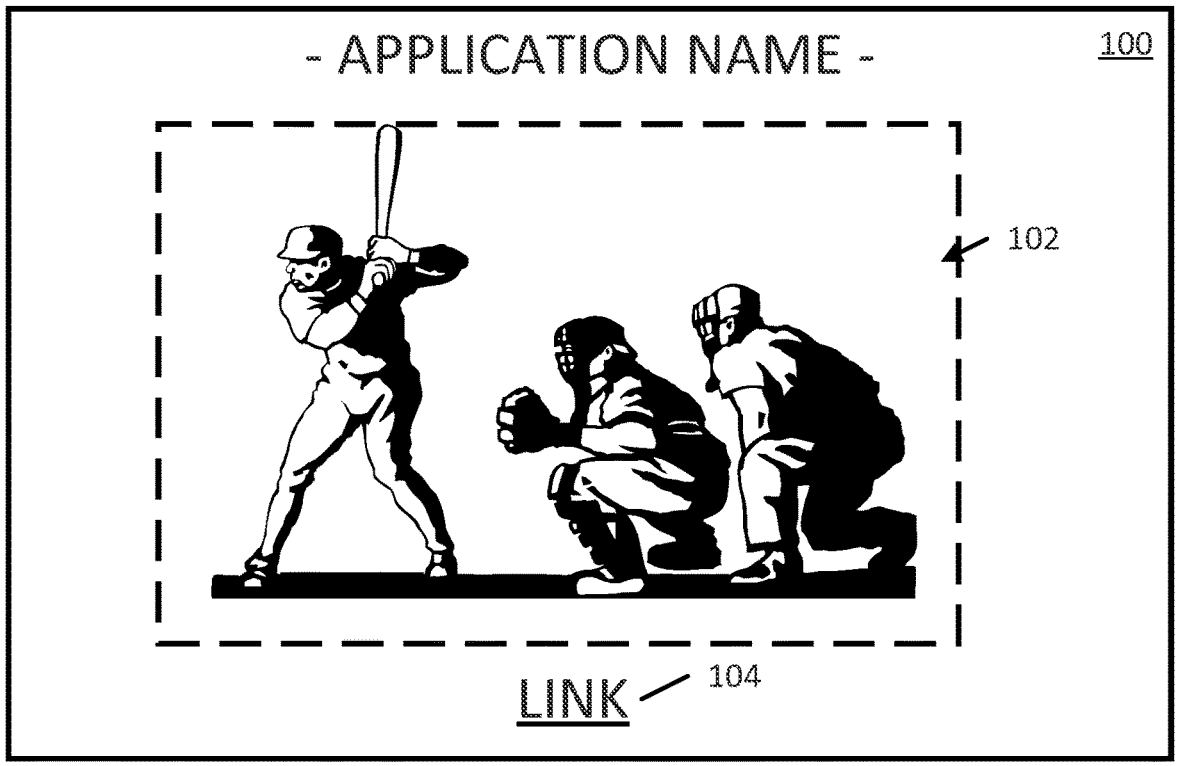
FIGS. 1A and 1B show examples of user interfaces for presenting a link and presenting content associated with the link in accordance with some embodiments of the disclosed subject matter.

In accordance with various embodiments, mechanisms (which can include methods, systems, and media) for retrieving content associated with links are provided.

In some embodiments, the mechanisms described herein can determine that a page is to be presented on a user device. For example, in some embodiments, the page can be a page that is to be presented through an application executing on the user device. As a more particular example, the page can be a home page of a service associated with the application, a page corresponding to particular content associated with the application, and/or any other suitable type of page. The mechanisms can then transmit a Remote Procedure Call (RPC) to a server that requests the content of the page as well as a mapping of links included within the page. The mapping of links can indicate any suitable information, such as a URL associated with the link and a corresponding endpoint or type of page associated with the link. For example, in instances where the link is to a video hosted by a particular video sharing service, the URL can specify the location of the link and the endpoint can indicate that the video is to be presented within a video watch page that includes a particular video player window, a particular logo associated with the video sharing service, and/or any other suitable elements. The user device can receive the content and the mapping, and can store the mapping in local memory of the user device. In response to receiving a selection of one of the links of the page during presentation of the page, the user device can use the stored mapping to determine an endpoint or a type of page in which the content corresponding to the selected link is to be presented and can begin loading the elements corresponding to the endpoint or the type of page while waiting for the server to transmit the content associated with the selected link.

In some embodiments, content associated with a page can be presented within an application executing on the mobile device in any suitable manner. For example, in some embodiments, the content can be presented within a web browser interface executing within the application, such as a WebView application or any other suitable web browser rendered within the application. As a more particular example, in some embodiments, the content associated with the page can be third-party content not associated with the application that is presented within a WebView in the application. Continuing with this example, a link within the content can be to a video provided by a video sharing service associated with the application that is to be provided through the application. The mechanisms described herein can intercept a selection of the link to the video through the WebView and can cause user interface elements associated with a video watch page to be loaded in the application while the video is buffered on the user device. Conversely, in some embodiments, the content of the page can be presented within the application, and a selected link can correspond to third-party content that is to be rendered within a WebView within the application. Continuing with this example, selection of a link within the content of the page can be intercepted, and elements associated with the WebView can be loaded within the application while the third-party content is transmitted to the user device.

The mechanisms described herein can therefore reduce a latency of a response when a link is selected within an application by allowing the user device to begin pre-loading elements of the page in which the content will be presented. In particular, in some embodiments, one or more round-trip messages between the user device and the server can be eliminated due to local storage of the mapping of URLs to endpoints on the user device when an initial page is first presented. Additionally, the mechanisms described herein can allow a developer of an application to make changes to user interface appearance through content delivered by the server without requiring each user device to download an update to the application on the user device. For example, by transmitting the endpoint information for links within a page presented on the application from the server to the user device, the server can include information about user interface elements corresponding to each endpoint (e.g., an appearance of a video player window, an appearance or location of a logo, an appearance or location of a discussion forum, and/or any other suitable elements) rather than requiring the user device to download an update to the application.

Turning to FIG. 1A, an illustrative example 100 of a user interface that can be presented on a user device is shown in accordance with some embodiments of the disclosed subject matter. As illustrated, user interface 100 can include page content 102 and a link 104. In some embodiments, user interface 100 can be presented within an application, for example, an application executing on a mobile device as shown in FIG. 1A.

In some embodiments, page content 102 can include any suitable type of content, such as video content, an image, an animation, text content, content from a web page, and/or any other suitable type of content. In instances where the content includes video content, page content 102 can be presented within a video player window that can include any suitable video player controls (e.g., a pause control, a volume control, and/or any other suitable type of controls).

In some embodiments, link 104 can be any suitable type of link. For example, link 104 can be a link to a web page, a link to a media content item (e.g., a link to a video, image, audio file, and/or any other suitable type of media content item), a link to a chat room or discussion forum, and/or a link to any other suitable type of content. In some embodiments, link 104 can link to content within an application through which user interface 100 is being presented. For example, in instances where user interface 100 is presented within an application associated with a video sharing service, link 104 can be to a different page associated with the video sharing service, such as a link to a different video accessed through the video sharing service, a link to a page of information accessed through the video sharing service, a link to a profile of a user of the video sharing service, and/or any other suitable type of page. Additionally or alternatively, in some embodiments, link 104 can link to content not associated with the application, such as a web page associated with a different entity, and/or any other suitable type of content.

Figure 1B:
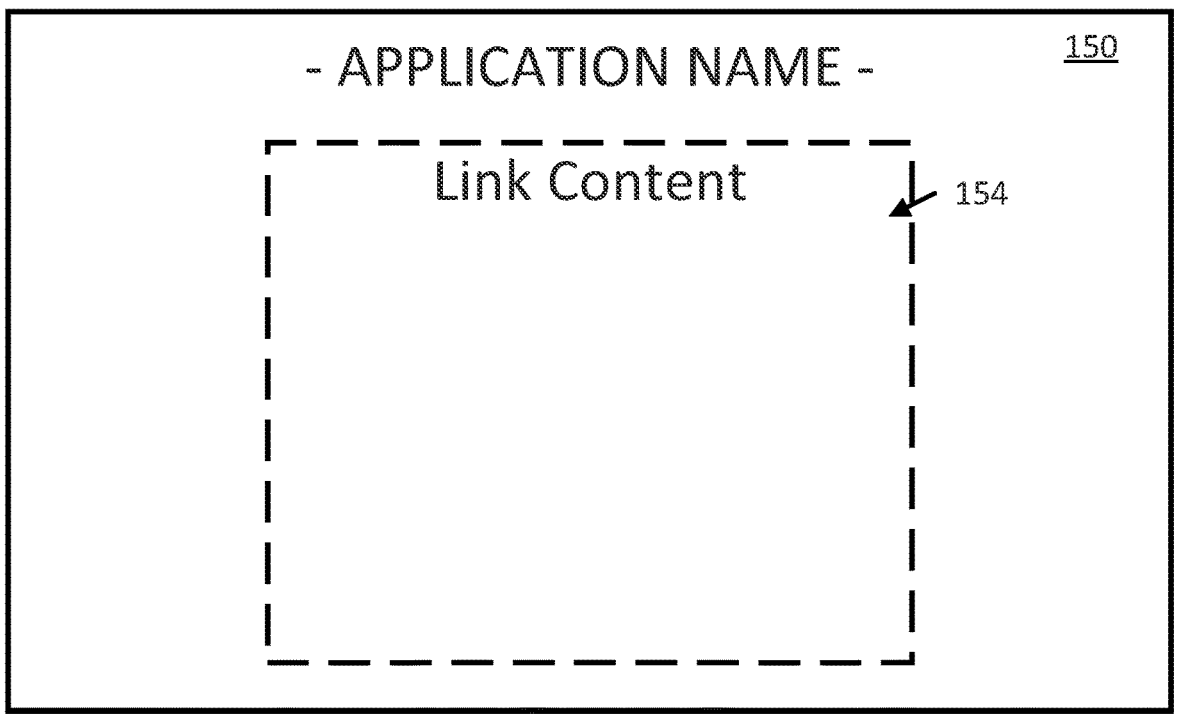

In some embodiments, selection of link 104 can cause user interface 150 to be presented. As illustrated, in some embodiments, user interface 150 can include link content 154 that can correspond to content associated with the selected link. Note that, in some embodiments, as shown in FIG. 1B, link content 154 can be presented within an application that presented user interface 100. For example, in some embodiments, even if link content 154 includes a web page not associated with the application, the web page can be presented within the application (e.g., within a web browser window rendered within the application).

Figure 2:
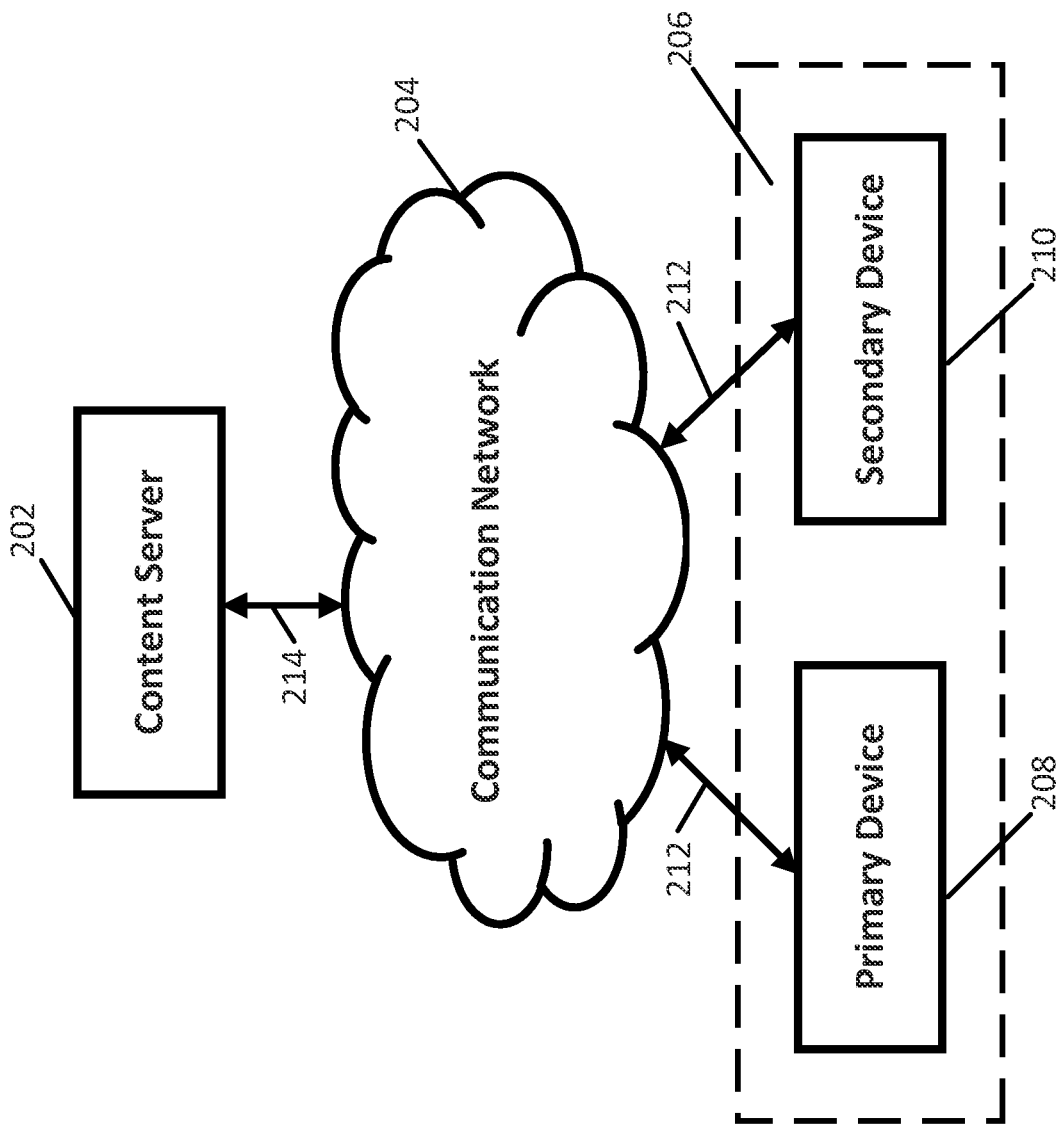
FIG. 2 shows a schematic diagram of an illustrative system suitable for implementation of mechanisms described herein for retrieving content associated with a link in accordance with some embodiments of the disclosed subject matter.

Turning to FIG. 2, an illustrative example 200 of hardware for retrieving and presenting content associated with a link that can be used in accordance with some embodiments of the disclosed subject matter is shown. As illustrated, hardware 200 can include one or more servers such as a content server 202, a communication network 204, and/or one or more user devices 206, such as user devices 208 and 210.

In some embodiments, content server 202 can be any suitable server for storing content and transmitting the content to a user device for presentation. For example, in some embodiments, content server 202 can be a server that streams media content to user device 206 via communication network 204. In some embodiments, the content on content server 202 can be any suitable content, such as video content, audio content, movies, television programs, live-streamed content, audiobooks, and/or any other suitable type of content. In some embodiments, content server 202 can be omitted.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links (e.g., communications link 214) to content server 202. Communications links 212 and/or 214 can be any communications links suitable for communicating data among user devices 206 and server 202 such as network links, dial-up links, wireless links, hard-wired links, any other suitable communications links, or any suitable combination of such links.

In some embodiments, user devices 206 can include one or more computing devices suitable for viewing audio or video content, receiving selections of links within a page of content, and/or any other suitable functions. For example, in some embodiments, user devices 206 can be implemented as a mobile device, such as a smartphone, mobile phone, a tablet computer, a wearable computer, a laptop computer, a vehicle (e.g., a car, a boat, an airplane, or any other suitable vehicle) entertainment system, a portable media player, and/or any other suitable mobile device. As another example, in some embodiments, user devices 206 can be implemented as a non-mobile device such as a desktop computer, a set-top box, a television, a streaming media player, a game console, and/or any other suitable non-mobile device.

Although content server 202 is illustrated as a single device, the functions performed by content server 202 can be performed using any suitable number of devices in some embodiments. For example, in some embodiments, multiple devices can be used to implement the functions performed by content server 202.

Although two user devices 208 and 210 are shown in FIG. 2, any suitable number of user devices, and/or any suitable types of user devices, can be used in some embodiments.

Figure 3:
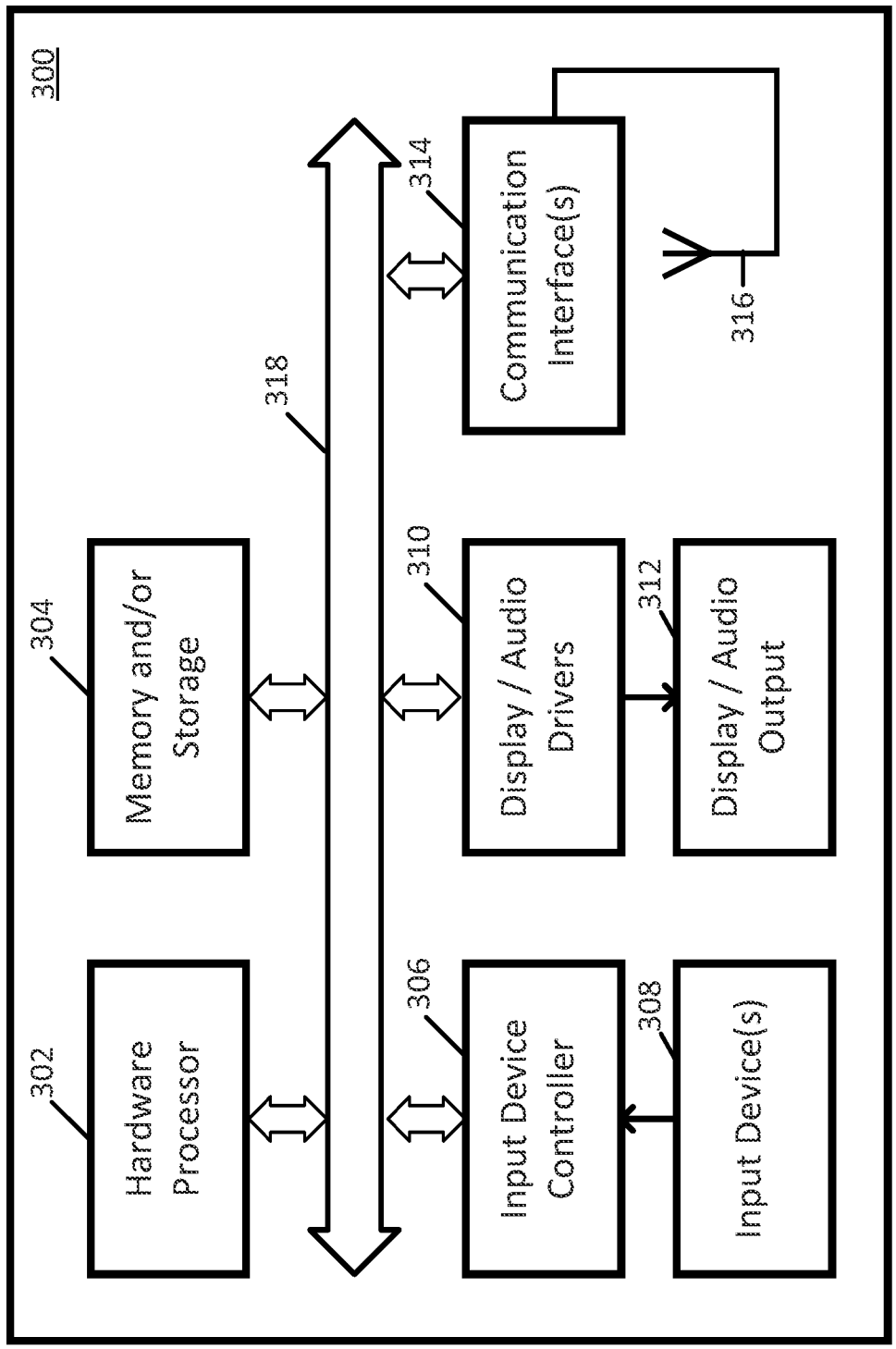
FIG. 3 shows a detailed example of hardware that can be used in a server and/or a user device of FIG. 2 in accordance with some embodiments of the disclosed subject matter.

Content server 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as content server 202). For example, the server program can cause hardware processor 302 of content server 202 to transmit content and/or a mapping of links within the content to a user device in response to receiving a request from the user device. In some embodiments, hardware processor 302 can be controlled by a computer program stored in memory and/or storage 304 of user device 206. For example, the computer program can cause hardware processor 302 of user device 206 to present a page, receive a selection of a link within the presented page, identify an endpoint associated with the link, transmit a request for content associated with the endpoint to content server 202, present content associated with the endpoint, and/or perform any other suitable functions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
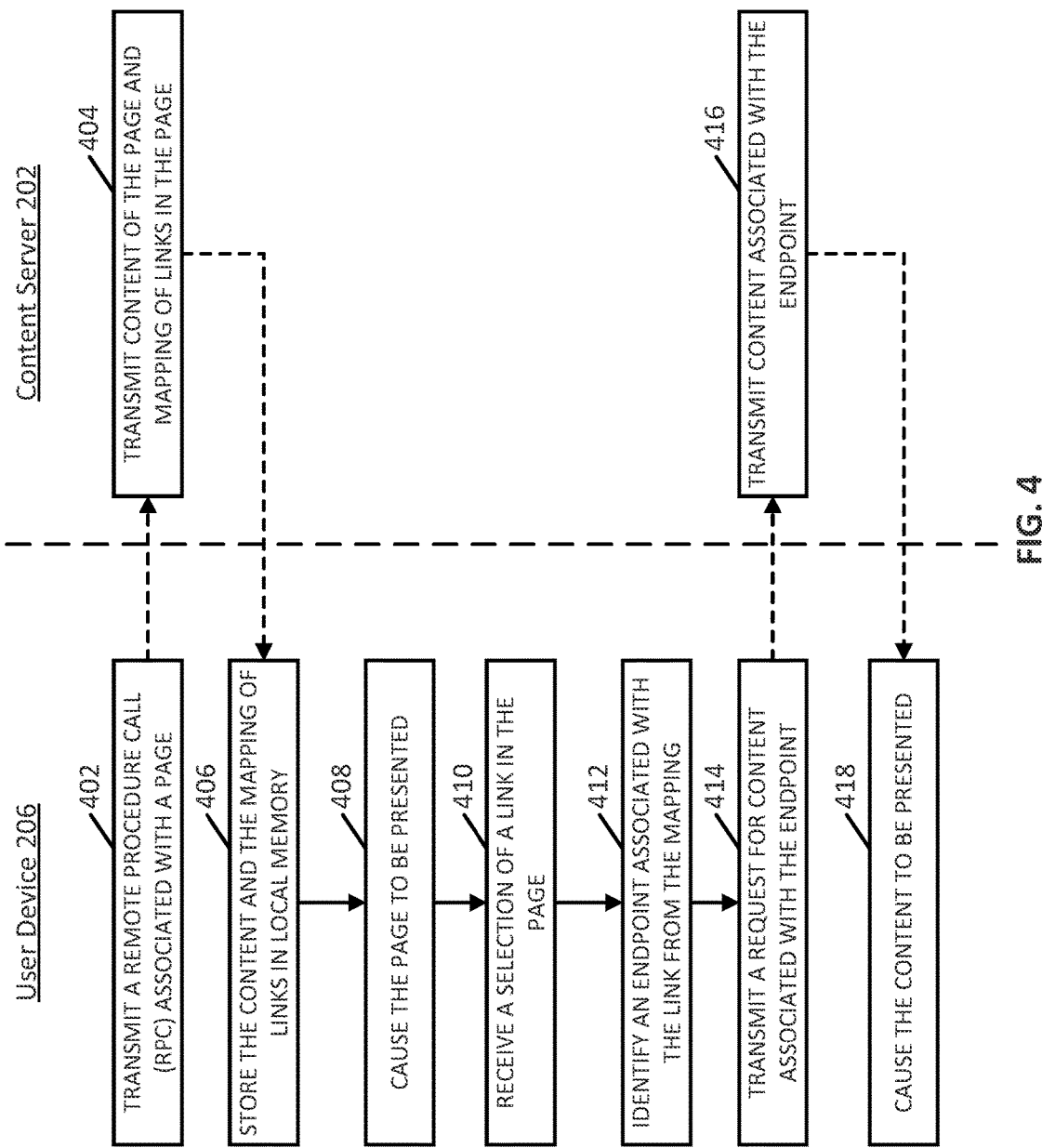
FIG. 4 shows an illustrative example of an information flow diagram for retrieving and presenting content associated with a link in accordance with some embodiments of the disclosed subject matter.

Turning to FIG. 4, an illustrative example 400 of an information flow diagram for retrieving and presenting content associated with a link is shown in accordance with some embodiments of the disclosed subject matter. As illustrated, in some embodiments, blocks of information flow diagram 400 can be implemented on user device 206 and content server 202.

At 402, user device 206 can transmit a Remote Procedure Call (RPC) to content server 202 that requests content associated with a page to be presented on user device 206. In some embodiments, the RPC can include any suitable information, such as an identity of a page to be presented (e.g., a URL associated with the page, and/or any other suitable identifying information). In some embodiments, the RPC can be made via an application within which the page is to be presented. In some such embodiments, the application can be any suitable application executing on user device 206, such as an application associated with a video sharing service, an application associated with a social networking service, and/or any other suitable type of application.

At 404, content server 202 can transmit the content of the page and a mapping of links included in the page to user device 206. In some embodiments, the content of the page can include any suitable content, such as text, images, animations, icons, videos, and/or any other suitable type of content. In some embodiments, the content of the page can be transmitted in any suitable format, such as in Hypertext Markup Language (HTML), and/or in any other suitable format. In some embodiments, the mapping of the links can include any suitable information. For example, in some embodiments, the mapping of the links can indicate key-value pairs for one or more of the links included in the page, where the key indicates a Uniform Resource Locator (URL) of the link and the value indicates an endpoint associated with the URL. As a more particular example, in instances where the application presenting the page is an application associated with a video sharing service, and a URL corresponding to a link is to a main page associated with a particular video, the endpoint can indicate that the URL corresponds to a video watch page (e.g., a page that includes a video player window in which the video is presented, a page that includes a comments section for commenting on the video, a page that includes a logo of the video sharing service, and/or a page that includes any other suitable elements).

Note that, in some embodiments, content server 202 can transmit to user device 206 any user interface elements for a user interface or instructions for rendering a user interface in which content associated with a link is to be presented. For example, in some embodiments, content server 202 can transmit user interface elements for a user interface corresponding to a video watch page, such as a logo of the video sharing service, instructions for rendering a comments section, instructions for rendering a video player window, and/or any other suitable elements or instructions. Additionally or alternatively, in some embodiments, the elements or instructions can have been previously received by user device 206 at any suitable time, for example, at a time when the application in which the content of the page is to be presented was downloaded or last updated.

At 406, user device 206 can store the received page content and the mapping of links in a local memory of user device 206 (e.g., memory 304 as shown in and described above in connection with FIG. 3).

User device 206 can cause the page to be presented at 408. In some embodiments, user device 206 can retrieve the stored page content from memory 304 to present the page content. In some embodiments, the page can be presented in any suitable manner. For example, as shown in and described above in connection with FIG. 1A, the page can be presented within a window of an application executing on user device 206. Note that, in some embodiments, the presented page can include any suitable content, such as a video, audio content, text, images, graphics, animations, icons, and/or any other suitable content. Additionally, in some embodiments, the presented page can include any suitable number (e.g., zero, one, two, five, ten, and/or any other suitable number) of links to other content. In some embodiments, the links can be to content associated with the application or links to content not associated with the application. For example, in some embodiments, one or more of the links can be deep links to other portions of the application or content within the application (e.g., to a particular section of the application, to a different page of a web site represented by the application, and/or any other suitable link within the application). Conversely, in some embodiments, one or more of the links can be links to third-party content not associated with the application, such as a web page or article hosted by the third-party. In some embodiments, the presented page can be presented within a WebView web browser rendered within the application executing on user device 206.

User device 206 can receive a selection of a link included in the page at 410. In some embodiments, the selection of the link can be received in any suitable manner. For example, in some embodiments, the selection can be received based on a user of user device 206 tapping or clicking on the link within the page.

User device 206 can identify an endpoint associated with the link at 412 based on the mapping of links stored in the local memory at 406. In some embodiments, the endpoint can indicate a type of page to be presented within the application based on the link. For example, in instances where the application is associated with a video sharing service and the link corresponds to a video to be presented within the application, the endpoint can indicate that the link is to be presented within a page that corresponds to a video watch page type (e.g., a page that includes a video player window, a section for presenting information about the video, a logo associated with a video sharing service that hosts the video, and/or any other suitable content). As a more particular example, in some embodiments, the endpoint can indicate generic user interface elements that correspond to the particular type of page in which the content associated with the link is to be presented.

User device 206 can transmit to content server 202 a request for content associated with the endpoint at 414. For example, in some embodiments, in instances where the link is a link to a video, user device 206 can transmit a request to begin transmitting data associated with the video to user device 206.

Note that, in some embodiments, user device 206 can begin loading a user interface associated with the type of page to be presented while waiting for the response to the request from content server 202. For example, in instances where the type of page corresponds to a video watch page, user device 206 can begin presenting a generic user interface for presenting a video that includes a video player window, a section for presenting information about a video, and/or any other suitable type of content.

At 416, content server 202 can respond to the received request by transmitting, to user device 206, the requested content. In instances where the requested content includes media content that is to be streamed (e.g., a video content item, an audio content item, a live-streamed video, and/or any other suitable type of media content, content server 202 can transmit a stream of data corresponding to the requested content.

At 418, user device 206 can present the received content. For example, in instances where the received content includes a video, user device 206 can begin presenting the video. As another example, in instances where the received content includes the content of a web page, user device 206 can present the web page. In some embodiments, the received content can be presented within the application executing on user device 206, as shown in and described above in connection with FIG. 1B. Furthermore, in some embodiments, the received content can be presented within a WebView web browser rendered within the application.

Figure 5:
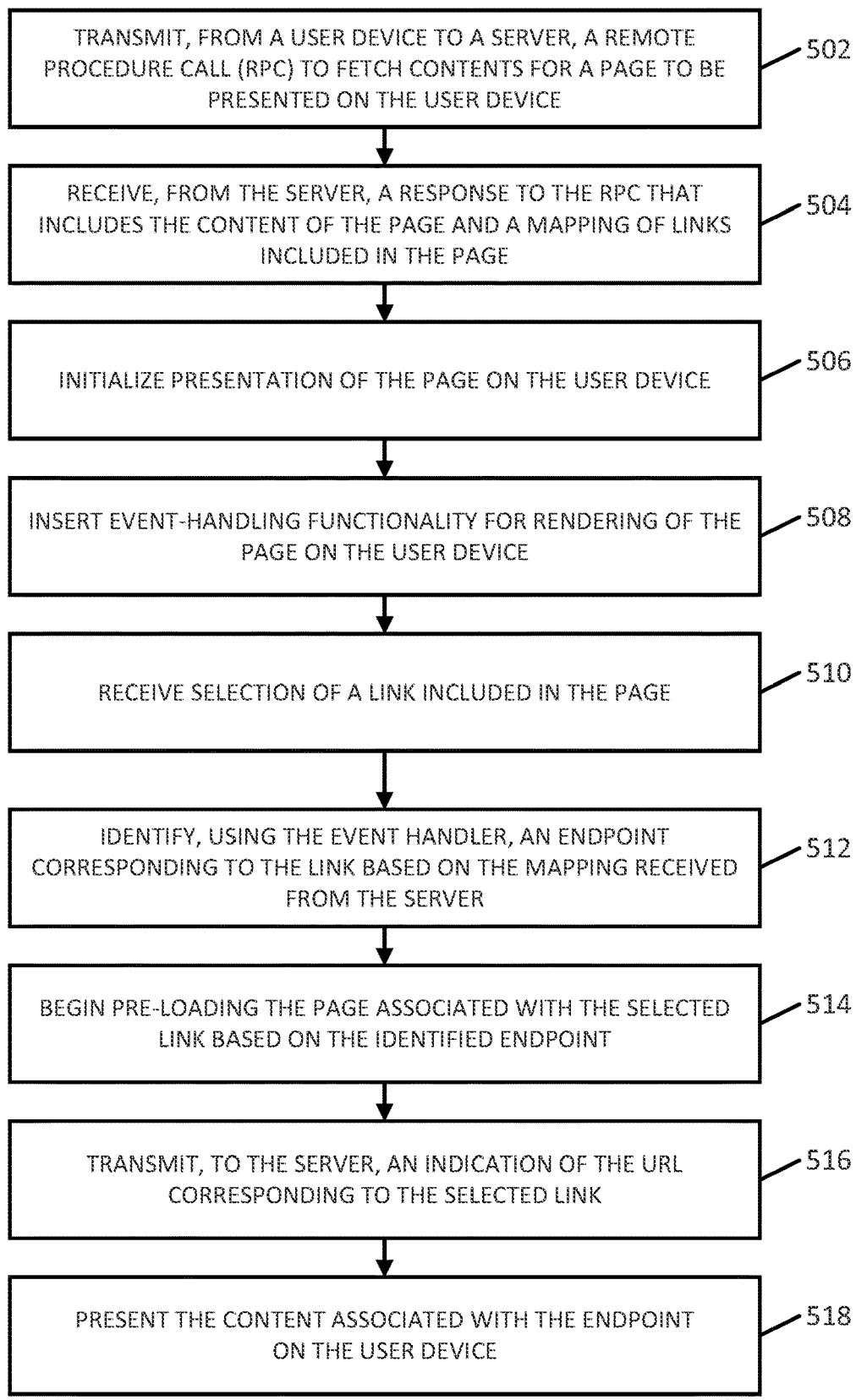
FIG. 5 shows an illustrative example of a process for retrieving and presenting content associated with a link in accordance with some embodiments of the disclosed subject matter.

Turning to FIG. 5, an illustrative example 500 of a process for retrieving and presenting content associated with a link is shown in accordance with some embodiments of the disclosed subject matter. In some embodiments, blocks of process 500 can be implemented on user device 206.

Process 500 can begin by transmitting, from a user device to a server, a Remote Procedure Call (RPC) to fetch contents for a page to be presented on the user device at 502. As described above in connection with block 402 of FIG. 4, the RPC can include any suitable information, such as an identifier of an application within which the page is to be presented, a URL associated with the page, and/or any other suitable information. In some embodiments, the page can be any suitable type of page, such as a web page, a page for viewing a media content item such as a video, a page associated with a social networking service, and/or any other suitable type of page.

At 504, process 500 can receive, from the server, a response to the RPC that includes content corresponding to the page and a mapping of links included in the page. The content corresponding to the page can include any suitable type(s) of content, such as video content, images, icons, animations, graphics, text, audio content, and/or any other suitable types of content. In some embodiments, the content corresponding to the page can be received in any suitable format, such as in HTML, and/or any other suitable format. In some embodiments, the mapping of links can include any suitable information about links included in the page. For example, as described above in connection with FIG. 4, the information can indicate a URL associated with a link and a corresponding endpoint or type of page associated with the URL. As a more particular example, in instances where the link is to a page to view a particular video, the URL can be "www.video.com/video1" and the endpoint or type of page associated with the URL can be "video watch page." Continuing with this example, a video watch page endpoint can indicate particular sections or user interface elements associated with a page of this type, such as a video player window within which a video is to be presented, a section for presenting information about the video, a comments section, a logo associated with a provider of the video, and/or any other suitable sections or elements. As another more particular example, in instances where the link is to a page that presents additional information about content on the presented page, the URL can be "www.video.com/videoinfo" and the endpoint or type of page associated with the URL can be "video information page." Continuing with this example, a video information page endpoint can indicate particular sections or user interface elements associated with a page of this type, such as a section for presenting images associated with the video, a section for presenting text associated with the information about the video, a section for discussing the video with other viewers, and/or any other suitable sections or elements. In some embodiments, the URL and the corresponding endpoint can be stored in any suitable format, such as a key-value pair.

Note that, in some embodiments, a link can correspond to a link associated with an application within which the page is being presented. For example, in instances where the application is associated with a video sharing service and the link corresponds to a video hosted by the video sharing service, the endpoint can indicate a video watch page associated with the video sharing service and can include sections or elements such as a logo associated with the video sharing service, a video player window with a visual appearance specific to the video sharing service, and/or any other suitable sections or elements. Additionally or alternatively, in some embodiments, a link can correspond to a page not associated with the application, for example, a web page or article associated with a different entity. In some such embodiments, the URL can indicate a location of the web page or article and the endpoint or type of page can indicate that the web page or article is to be presented within a browser window rendered within the application (e.g., a WebView, or any other suitable browser window).

In some embodiments, the user device can store the received content and the mapping of the links in any suitable location. For example, in some embodiments, the user device can store the received content and the mapping of the links in a local memory of the user device (e.g., memory 304 as shown in and described above in connection with FIG. 3).

At 506, process 500 can initialize presentation of the page on the user device. For example, in some embodiments, process 500 can retrieve the content corresponding to the page from the local memory of the user device (e.g., memory 304 as shown in and described above in connection with FIG. 3).

At 508, process 500 can insert any suitable event handling functionality into HTML content associated with the page that is to be presented. For example, in some embodiments, process 500 can insert event handlers that correspond to links in the page that specify one or more actions to be taken in response to receiving a selection of the link. As a more particular example, in some embodiments, the event handler can correspond to the "onclick" JavaScript event handler that can indicate a function to be called when a corresponding link is selected. As a specific example, in instances where an HTML tag corresponding to a link is "<a href="www.video.com/video1">LINK</a>", process 500 can insert an event handler that indicates that a function is to be called when the link is selected. Continuing with this example, process 500 can modify the HTML tag to be "<a href=www.video.com/video1onClick="exampleFunction( )"LINK</a>". Note that, although the examples described above include JavaScript event handlers, in some embodiments, event handlers corresponding to any suitable language can be used. Additionally, in some embodiments, the event handling functionality can be inserted by either the user device (e.g., after receiving the HTML content from the server) or by the server (e.g., prior to transmitting the HTML content to the user device).

Process 500 can then cause the page to be presented on the user device. In some embodiments, the page can be presented within an application executing on the user device. Additionally, in some embodiments, the page can be presented within a WebView in the application.

At 510, process 500 can receive a selection of a link from the user device. For example, in some embodiments, process 500 can receive an indication that a user of the user device has tapped, clicked on, or otherwise selected a link included within the page presented on the user device.

At 512, process 500 can identify, using the event handler corresponding to the selected link, an endpoint corresponding to the link. For example, in some embodiments, the event handler can indicate a function that, when called, identifies the endpoint or type of page that corresponds to the URL of the selected link as indicated in the mapping received at block 504. Note that, in some embodiments, the function associated with the event handler can call a second function associated with, for example, the application executing on the mobile device, and the second function (e.g., an application handler) can then identify the endpoint or type of page based on the mapping. Additionally or alternatively, in some embodiments, the application handler can be associated with a WebView application that presents a web browser interface within the application executing on the mobile device.

At 514, process 500 can begin pre-loading the page or content associated with the selected link based on the endpoint identified at block 512. For example, in instances where the selected link indicates a video to be presented and the endpoint indicates that the video is to be presented within a video watch page, process 500 can begin loading sections or elements corresponding to a video watch page. As a more particular example, the loaded sections or elements corresponding to the video watch page can be generic elements that would be present on the page regardless of the specific video, such as a video player window within which the video is to be presented, a section of a user interface for presenting information about the video, a logo associated with a provider of the video, a comments section associated with the video, and/or any other suitable elements. In some embodiments, these elements can be loaded from local memory (e.g., memory 304) of the user device.

Process 500 can transmit, to the server, a request for content associated with the selected link at 516. In some embodiments, the request can include an indication of the URL corresponding to the selected link. Note that, in some embodiments, process 500 can continue pre-loading the page as described above in connection with block 514 while waiting for a response from the server.

At 518, process 500 can receive the requested content from the server and can present the content associated with the selected link. As described above in connection with FIG. 1A, the content can be presented in any suitable manner. For example, as shown in FIG. 1A, the content can be presented within an application executing on the mobile device from which the link was selected. In some embodiments, the content can be presented within a web browser rendered within the application. For example, in instances where the selected link corresponds to web content (e.g., a web page, an online article, and/or any other suitable type of content), the content can be presented within a WebView in the application on the user device.

In some embodiments, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for retrieving content associated with links are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for retrieving content associated with links, the method comprising:
   receiving, from a server at a user device, content corresponding to a first page and a mapping of the first page, wherein the mapping includes an association of a link included in the content corresponding to the first page to a plurality of user interface elements that are included in a second page corresponding to the link and a key-value pair associated with the link in which the a value in the key-value pair corresponds to the plurality of user interface elements;
   causing the content of the first page to be presented within an application executing on the user device;
   receiving a selection of the link included in the content of the first page;
   retrieving, based on the mapping of the first page, the plurality of user interface elements;
   transmitting, to the server, a request for media content associated with the second page;
   causing the plurality of user interface elements to be presented within a user interface corresponding to the second page while the requested media content is buffered from the server; and
   in response to receiving the requested media content from the server, causing the media content to be presented within the user interface.

2. The method of claim 1, wherein each of the plurality of user interface elements has been previously received by the user device from the server and stored on the user device.

3. The method of claim 1, further comprising:
   determining whether each of the plurality of user interface elements has been previously received by the user device from the server and stored on the user device; and
   in response to determining that at least one user interface element from the plurality of user interface elements has not been previously received by the user device from the server and stored on the user device, causing the at least one user interface element to be retrieved and stored on the user device.

4. The method of claim 1, wherein the first page is a first webpage and wherein the second page is a second webpage.

5. The method of claim 1, wherein the user interface corresponding to the second page is presented within a web browser application.

6. The method of claim 1, wherein the plurality of user interface elements correspond to static elements of the second page associated with a type of webpage of the second page.

7. A system for retrieving content associated with links, the system comprising:
   a hardware processor that:
      receives, from a server at a user device, content corresponding to a first page and a mapping of the first page, wherein the mapping includes an association of a link included in the content corresponding to the first page to a plurality of user interface elements that are included in a second page corresponding to the link and a key-value pair associated with the link in which the a value in the key-value pair corresponds to the plurality of user interface elements;
      causes the content of the first page to be presented within an application executing on the user device;
      receives a selection of the link included in the content of the first page;
      retrieves, based on the mapping of the first page, the plurality of user interface elements;
      transmits, to the server, a request for media content associated with the second page;
      causes the plurality of user interface elements to be presented within a user interface corresponding to the second page while the requested media content is buffered from the server; and
      in response to receiving the requested media content from the server, causes the media content to be presented within the user interface.

8. The system of claim 7, wherein each of the plurality of user interface elements has been previously received by the user device from the server and stored on the user device.

9. The system of claim 7, wherein the hardware processor also:
   determines whether each of the plurality of user interface elements has been previously received by the user device from the server and stored on the user device; and
   in response to determining that at least one user interface element from the plurality of user interface elements has not been previously received by the user device from the server and stored on the user device, causes the at least one user interface element to be retrieved and stored on the user device.

10. The system of claim 7, wherein the first page is a first webpage and wherein the second page is a second webpage.

11. The system of claim 7, wherein the user interface corresponding to the second page is presented within a web browser application.

12. The system of claim 7, wherein the plurality of user interface elements correspond to static elements of the second page associated with a type of webpage of the second page.

13. A non-transitory computer-readable medium containing computer executable instructions that, when executed, cause a hardware processor to perform a method for retrieving content associated with links, the method comprising:

receiving, from a server at a user device, content corresponding to a first page and a mapping of the first page, wherein the mapping includes an association of a link included in the content corresponding to the first page to a plurality of user interface elements that are included in a second page corresponding to the link and a key-value pair associated with the link in which the a value in the key-value pair corresponds to the plurality of user interface elements;

causing the content of the first page to be presented within an application executing on the user device;

receiving a selection of the link included in the content of the first page;

retrieving, based on the mapping of the first page, the plurality of user interface elements;

transmitting, to the server, a request for media content associated with the second page;

causing the plurality of user interface elements to be presented within a user interface corresponding to the second page while the requested media content is buffered from the server; and in response to receiving the requested media content from the server, causing the media content to be presented within the user interface.

14. The non-transitory computer-readable medium of claim 13, wherein each of the plurality of user interface elements has been previously received by the user device from the server and stored on the user device.

15. The non-transitory computer-readable medium of claim 13, wherein the method further comprises:

determining whether each of the plurality of user interface elements has been previously received by the user device from the server and stored on the user device; and in response to determining that at least one user interface element from the plurality of user interface elements has not been previously received by the user device from the server and stored on the user device, causing the at least one user interface element to be retrieved and stored on the user device.

16. The non-transitory computer-readable medium of claim 13, wherein the first page is a first webpage and wherein the second page is a second webpage.

17. The non-transitory computer-readable medium of claim 13, wherein the user interface corresponding to the second page is presented within a web browser application.

18. The non-transitory computer-readable medium of claim 13, wherein the plurality of user interface elements correspond to static elements of the second page associated with a type of webpage of the second page.

* * * * *